(12) United States Patent
Gaß et al.

(10) Patent No.: US 12,015,911 B2
(45) Date of Patent: Jun. 18, 2024

(54) METHOD AND SYSTEM FOR PROVIDING PRIVACY PROTECTION IN PREPARATION FOR A PHONE CALL BETWEEN A VEHICLE OCCUPANT AND A REMOTE CONVERSATION PARTNER

(71) Applicants: HYUNDAI MOTOR COMPANY, Seoul (KR); KIA CORPORATION, Seoul (KR)

(72) Inventors: Lukas Günter Gaß, Mainz (DE); Adrian Bablok, Wiesbaden (DE); Michael Schreiber, Frankfurt am Main (DE); Ingmar Langer, Darmstadt (DE)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 356 days.

(21) Appl. No.: 17/519,330

(22) Filed: Nov. 4, 2021

(65) Prior Publication Data

US 2023/0016538 A1 Jan. 19, 2023

(30) Foreign Application Priority Data

Jul. 13, 2021 (DE) .......................... 102021207437.5

(51) Int. Cl.
*H04W 4/40* (2018.01)
*H04W 4/20* (2018.01)
*H04W 12/02* (2009.01)

(52) U.S. Cl.
CPC ............. *H04W 12/02* (2013.01); *H04W 4/20* (2013.01); *H04W 4/40* (2018.02)

(58) Field of Classification Search
CPC ......... H04W 12/02; H04W 4/20; H04W 4/40; H04W 12/082; H04W 4/16; H04L 63/101; H04M 1/72454; H04M 1/724098
See application file for complete search history.

(56) References Cited

U.S. PATENT DOCUMENTS

| 10,291,996 | B1* | 5/2019 | Shaffer ............... H04M 1/6083 |
| 10,423,845 | B2* | 9/2019 | Miller .................. B60R 25/305 |
| 10,674,003 | B1* | 6/2020 | Kang ................ H04M 1/72433 |
| 10,999,419 | B1* | 5/2021 | Willis ..................... G06F 16/68 |
| 11,516,643 | B1* | 11/2022 | Hajdu ..................... H04L 51/02 |
| 2015/0120305 | A1* | 4/2015 | Buck ........................ H04R 3/12 |
| | | | 704/275 |

(Continued)

*Primary Examiner* — Kenneth T Lam
(74) *Attorney, Agent, or Firm* — Lempia Summerfield Katz LLC

(57) ABSTRACT

A method for providing privacy protection in preparation for a phone call between a vehicle occupant of a vehicle and a remote conversation partner is provided. The method includes detecting, by an occupant detection system of the vehicle, additional listeners inside the vehicle. The method further includes receiving a call request with a telecommunication system in the vehicle for a phone call between the vehicle occupant and the remote conversation partner, the phone call being an outgoing call or an incoming call. The method further includes sending a notification to the remote conversation partner with the telecommunication system prior to establishment of the requested phone call informing the remote conversation partner about the presence of detected additional listeners.

11 Claims, 1 Drawing Sheet

(56) References Cited

U.S. PATENT DOCUMENTS

| | | | |
|---|---|---|---|
| 2015/0256668 A1* | 9/2015 | Atkinson | H04W 4/48 |
| | | | 455/418 |
| 2016/0059864 A1* | 3/2016 | Feit | H04M 1/6075 |
| | | | 701/36 |
| 2017/0323639 A1* | 11/2017 | Tzirkel-Hancock | ......... |
| | | | B60H 1/00757 |
| 2022/0182819 A1* | 6/2022 | Yae | H04W 12/06 |

* cited by examiner

METHOD AND SYSTEM FOR PROVIDING PRIVACY PROTECTION IN PREPARATION FOR A PHONE CALL BETWEEN A VEHICLE OCCUPANT AND A REMOTE CONVERSATION PARTNER

CROSS REFERENCE TO RELATED APPLICATION

This application claims priority to and the benefit of German Patent Application No. 102021207437.5 filed in the German Patent and Trademark Office on Jul. 13, 2021, the entire contents of which are incorporated herein by reference.

TECHNICAL FIELD

The present disclosure pertains to a method and a system for providing privacy protection in preparation for a phone call between a vehicle occupant and a remote conversation partner as well as to a motor vehicle with such a system.

BACKGROUND

In case of a telephone or video call between a vehicle occupant, e.g. a driver, and a remote conversation partner, it is usually not possible for the remote conversation partner to know prior to establishment of the connection whether additional occupants are present inside the vehicle or not. Such potential additional listeners may however lead to unpleasant situations when a phone call is put through without prior warning. For example, confidential information may be unintentionally spread during business calls by starting a conversation without checking for unauthorized parties inside the vehicle. Furthermore, it could make additional occupants of a vehicle uncomfortable, e.g. family members, children, friends and the like, if the driver openly announces to the caller, e.g. a business partner or supervisor from work, that he or she is not able to take the call due to the additional listeners in the vehicle.

These aspects may also become relevant for various driving applications including taxi driving, ride hailing, ride pooling, ride sharing and other car sharing concepts that pool passengers with similar pick-up points and destinations together in one ride. For example, professional taxi drivers may not want to share private or business information with their passengers during phone calls. To give another example, commercial pooling services need to comply with General Data Protection Regulation (GDPR) or similar regulations on data protection and privacy that dictate how personal data can be transferred and shared, which may be problematic when a caller should be able to find out about the occupancy status of a vehicle.

The Truecaller smartphone application promotes a system that informs a person receiving a call from an unknown number about the identity of the caller before the phone call is put through.

SUMMARY

Hence, there is a need to find solutions for increasing privacy protection for in-vehicle phone conversations against potential additional listeners inside a vehicle.

To this end, the present disclosure provides a method and a system for providing privacy protection in preparation for a phone call between a vehicle occupant of a vehicle and a remote conversation partner. The present disclosure also provides a motor vehicle including the system for providing privacy protection in preparation for a phone call between a vehicle occupant of a vehicle and a remote conversation partner.

According to one aspect of the present disclosure, a method for providing privacy protection in preparation for a phone call between a vehicle occupant of a vehicle and a remote conversation partner comprises detecting, by an occupant detection system of the vehicle, additional listeners inside the vehicle; receiving a call request with a telecommunication system in the vehicle for the phone call between the vehicle occupant and the remote conversation partner, the phone call being an outgoing call or an incoming call; and sending a notification to the remote conversation partner with the telecommunication system prior to establishment of the requested phone call informing the remote conversation partner about the presence of detected additional listeners.

According to another aspect of the present disclosure, a system for providing privacy protection in preparation for a phone call between a vehicle of a vehicle occupant and a remote conversation partner comprises an occupant detection system configured to detect additional listeners inside the vehicle; and a telecommunication system configured to receive a call request for the phone call between the vehicle occupant and the remote conversation partner, the phone call being an outgoing call or an incoming call; wherein the telecommunication system is configured to send a notification to the remote conversation partner prior to establishment of the requested phone call informing the remote conversation partner about the presence of detected additional listeners.

According to yet another aspect of the present disclosure, a motor vehicle comprises the system for providing privacy protection in preparation for a phone call between a vehicle of a vehicle occupant and a remote conversation partner as described above.

One aspect of the present disclosure is to inform the remote conversation partner prior to connecting a call about the presence of additional listeners in the vehicle by sending a corresponding message from the telecommunication system in the vehicle, e.g. an in-vehicle infotainment system, to the respective telecommunication system of the remote conversation partner, e.g. also an in-vehicle infotainment system or a phone, a computer, a video conference system and the like. The remote conversation partner thus gets the possibility to cancel the call before the voice connection is actually established. For example, the infotainment system or the phone of the remote conversation partner may display a corresponding message and/or play a respective audio file via a speaker system (e.g. "the person you are calling is accompanied by other persons" or "the person calling you is not alone") and may then wait for a predefined time period (e.g. 3 to 5 seconds) until the connection is actually established. The system of the remote conversation partner may also request an active confirmation from the remote conversation partner to continue with the call, which would otherwise be cancelled automatically after a predefined time period when additional listeners are detected. The remote conversation partner may then decide to take the call taking into account the fact that additional listeners are present and adopt the content of the call accordingly.

As a consequence, privacy of the person in the vehicle and of the remote partner is protected when third parties could overhear the conversation, leaving it to the discretion of these two if they continue with the call or not. Unpleasant conversations and embarrassing situations can thus be avoided with benefits not only for both parties but also for the additional listeners, which do not get into unpleasant situations. Instead, the communication is made transparent by allowing the remote person to adopt an appropriate way of speaking and content. Unintentional information leakage is thus practically eliminated in this respect. The aspects of the present disclosure do not require special hardware but can be realized as a software update for smartphones, car phones, infotainment systems and the like.

It is to be understood that the present method and system may not only be realized on basis of in-vehicle infotainment systems, which connect the drivers or other occupants of one vehicle to another. In addition, mobile phones may be utilized for the same purpose, e.g. the smartphone of the drivers and/or of the passengers of two vehicles. These may also be communicatively coupled to a respective infotainment system inside the vehicle for that purpose. A remote conversation partner within the meaning of the present disclosure thus includes anyone at a remote location, e.g. another vehicle, a building and the like, calling a person inside the vehicle or receiving a call from someone inside of the vehicle via any kind of device, e.g. a smart phone, a video conferencing system, a computer, an infotainment system, a car phone, and the like.

It is understood that the term "vehicle" or "vehicular" or other similar term as used herein is inclusive of motor vehicles in general such as passenger automobiles including sports utility vehicles (SUVs), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. Moreover, trains, aircraft, watercraft and the like also belong to vehicles within the meaning of the present disclosure.

Advantageous embodiments and improvements of the present disclosure are found in the subordinate claims.

According to an embodiment of the present disclosure, the occupant detection system may be configured to detect the additional listeners by using a camera, a microphone, a near field radar, a seat occupation sensor, a seat-belt sensor and/or passenger booking information.

The detection can thus be done using various different sensor systems as they are known to a person having ordinary skill in the art from other applications, which also require to establish if one or several seats are occupied or not. The system may include, for example, seat detection mats, seatbelt sensors, cameras, microphones, radars, and/or weight sensors. It is to be understood of course that these sensing approaches may be combined.

According to an embodiment of the present disclosure, the telecommunication system may be configured to access a contact blacklist listing contacts for which the notification is suppressed by the telecommunication system irrespective of any detected additional listeners when the respective contact serves as the remote conversation partner.

The blacklist may be for example a personal blacklist of a driver or other occupant of the vehicle for disabling the system specifically for particular contacts. Thus, instead of having to disable the whole system in order to suppress sending the notification, the user may manually put certain contacts from his or her contact list on the blacklist. The blacklist is then accessed by the system automatically in case of incoming and/or outgoing calls. If the corresponding remote conversation partner turns out to be on the respective list, he or she will not be informed about the current vehicle occupancy status and thus the system is effectively disabled in an automatic vein in case of these specific occupants.

According to an embodiment of the present disclosure, the occupant detection system may be configured to allocate an occupant status to each detected additional listener, the occupant status defining privacy settings for respective detected additional listeners. The telecommunication system may be configured to send the notification to the remote conversation partner depending on the allocated occupant statuses of the detected additional listeners.

For example, the notification may be adapted according to the status of each respective occupant. In one example, the occupant status may specify that family members, e.g. children, are present. The remote caller may then be informed accordingly that the family or children of the receiver are present. In another example, the occupant status may specify that passengers are present in a professional ride hailing vehicle. The system of the remote conversation partner may be informed about the status and the message played to the remote partner may be adopted accordingly to take this additional information into account.

According to an embodiment of the present disclosure, the telecommunication system may be configured to suppress the notification when the occupant statuses define a privacy exception for at least one of the detected additional listeners.

Thus, the system may be enhanced by creating exceptions with regards to the detected additional listeners specifically for particular vehicle occupants. For example, a driver may add an exception for certain occupants as soon as the certain occupants are detected for the first time inside the vehicle. When an occupant with a defined exception rule is identified or detected inside the vehicle, the respective message may be suppressed (irrespective of whether further occupants are present or not). The system thus gets effectively deactivated automatically for this specific occupant. As a consequence, it is not possible anymore to determine the vehicle occupancy status by calling the driver. The driver may receive a notification about the deactivated system, e.g. via a Head-Up-Display (HUD) or directional sound technology. Thus, the other occupants will not notice the deactivation or existence of the privacy protection system.

According to an embodiment of the present disclosure, the occupant detection system may be configured to allocate the occupant statuses by identifying the respective detected additional listeners by identifying a personal electronic device within the vehicle, employing facial recognition, employing voice recognition, analyzing boarding patterns, verifying passenger booking information and/or evaluating an occupation history of the vehicle.

Hence, an occupant identification process may be run automatically each time a new occupant is detected inside the vehicle. The identification can then be used, for example, to allocate exceptions to specific passengers, which define how the system reacts during calls when these passengers are present inside the vehicle.

In a ride-pooling application, for example, the system may notice each time a passenger enters or leaves the vehicle. In addition, a specific seat may be allocated to each passenger, e.g. the seat whose sensor signal is picked up by the sensor system immediately after the passenger has entered the vehicle. The identity of the passenger may be known, e.g. due to booking/reservation information and the time/location of the pick-up, due to facial recognition, voice recognition and the like, and can thus be allocated to the respective seat.

In a similar vein, a taxi driver, for example, may manually check-in new passengers in the respective system, possibly including passenger identification. It should be clear though that passenger information may already be available in advance based on booking data.

In a general application, e.g. private driving, passenger detection and possibly seat allocation may also be done, for example, via a camera system that identifies each passenger on his or her respective seat, which thus can directly be allocated to the passengers via optical confirmation.

In general, various technologies may be used for the above purposes. For example, an interior camera may be used for visual confirmation of a passenger via face recognition or the like. Interior microphones may similarly be used to analyze speech patterns in order to recognize the voice of specific passengers. Exterior and/or interior cameras may be used to analyze the boarding behavior of persons, e.g. a step sequence may be used to identify certain persons.

In a particular example, the system may initialize as soon as a passenger enters the vehicle (e.g. door opens, seatbelt closes, seat weight sensor gets a signal and the like). The system then may start to collect information on the passenger, e.g. by retrieving data from a database, vehicle/seat occupation and/or driving history of the vehicle. Additionally, or alternatively, various sensor systems may be used to gather further information on the passenger and the occupied seat (e.g. personal electronic device names, pictures, voices, time/weekday/location of ingress/egress, and the like).

For example, the passenger may be identified during ingress by matching ride-pooling/hailing information with a seatbelt status or the status of any other occupancy sensor (e.g., seat detection mat). Also, (wireless) electronic networks may be used to identify the occupants by tracking and matching electronic devices as soon as an occupant enters a vehicle (device names, signal strength as a function of position, ingress timestamp and the like). Face recognition may be used to identify occupants based on camera data which is matched with pictures/images from a database and/or a driving history. In a similar vein, interior microphones may be used to identify the voice of individual passengers based on unique frequency patterns. Based on directional information, the corresponding seats may then be allocated to the passengers. Predictive navigation may be used to remember passengers depending on time and/or position (destination, pick-up location), e.g., by employing Global Positioning System (GPS) data. A person having ordinary skill in the art should readily conceive further examples based on sensor and tracking technologies as they are known from other applications.

The occupant detection system may be configured to track changes in individual seat occupation when a passenger enters or leaves the vehicle. For example, each time a carpooling vehicle arrives at a pick-up position and one of its doors opens, the system may determine the seat taken by the new passenger based on seat mat detection and/or seatbelt sensors. The respective seat may then be allocated to the respective passenger. In a similar vein, each time a passenger exits the vehicle at a destination location the respective seat may be removed from the list of allocated seats.

The present disclosure is explained in greater detail with reference to embodiments depicted in the drawings as appended.

BRIEF DESCRIPTION OF THE DRAWINGS

The accompanying drawings are included to provide a further understanding of the present disclosure and are incorporated in and constitute a part of this specification. The drawings illustrate the embodiments of the present disclosure and together with the description serve to explain the principles of the present disclosure. Other embodiments of the present disclosure and many of the intended advantages of the present disclosure should be readily appreciated as they should become better understood by reference to the following detailed description. The elements of the drawings are not necessarily to scale relative to each other. In the figures, like reference numerals denote like or functionally like components, unless indicated otherwise.

Although specific embodiments are illustrated and described herein, it should be appreciated by those having ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION

Figure 1:
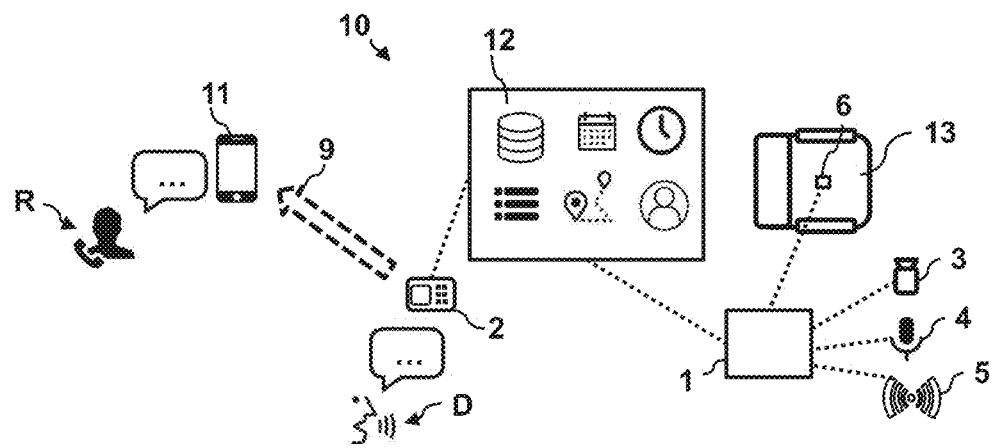
FIG. 1 schematically depicts a system according to an embodiment of the present disclosure for providing privacy protection in preparation for a phone call between a vehicle occupant and a remote conversation partner.
Figure 2:
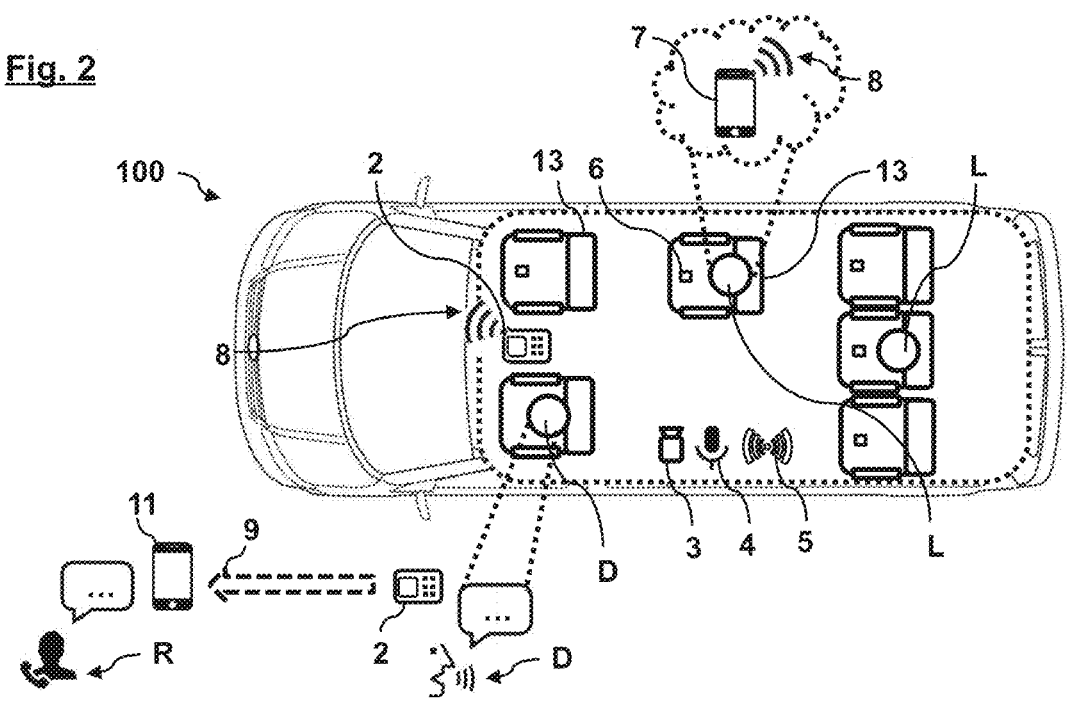
FIG. 2 schematically shows a motor vehicle with the system of FIG. 1.
Figure 3:
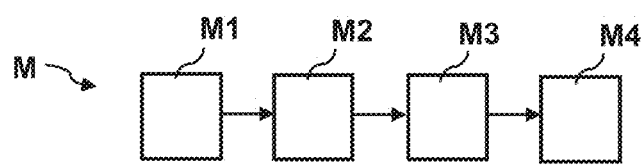
FIG. 3 shows a flow diagram of a method for providing privacy protection with the system of FIG. 1.

FIG. 1 schematically depicts a system 10 according to an embodiment of the present disclosure for providing privacy protection in preparation for a phone call between a vehicle occupant D of a vehicle 100, e.g. the motor vehicle 100 shown in FIG. 2, and a remote conversation partner R. A flow diagram of a corresponding method M for providing privacy protection with the system 10 of FIG. 1 is shown in FIG. 3.

The system 10 includes an in-vehicle telecommunication system 2, e.g. an infotainment system or a car phone, installed inside the vehicle 100 that allows the vehicle occupant D to make and receive telephone and/or video calls to and from the outside of the vehicle 100. To this end, the telecommunication system 2 may be communicatively coupled to a mobile phone of the vehicle occupant D. It is to be understood, however, that mobile phones, portable computers, smartphones, smartwatches or similar personal electronic devices employed by persons inside the vehicle 100 may also be used in a similar vein directly in other embodiments of the present disclosure. It is also to be understood that the telecommunication system 2 does not necessarily have to be permanently integrated in the vehicle 100.

The system 10 is provided to avoid potentially compromising situations during phone calls between the vehicle occupant D, e.g., a driver, and the remote conversation partner R, e.g., a business associate of the driver D, which may arise due to the fact that additional listeners L are present in the vehicle 100 who may overhear statements not intended for them, e.g., confidential information. As the remote conversation partner R will usually not be aware beforehand of these additional listeners L, he or she may immediately start the conversation as soon as the call is put through and may then make compromising statements before the driver D can intervene. Furthermore, the additional listeners L may get uncomfortable if the driver D should then openly announce that additional listeners L are around and that the remote conversational partner R should take this into account.

The above situation could be avoided, however, when the remote conversation partner R is warned about the potential listeners L before the connection is actually established. Thus, in order to overcome these problems, the present system 10 uses an occupant detection system 1 of the vehicle 100 to detect additional listeners L inside the vehicle 100. The present system 10 then sends a notification 9 to the remote conversation partner R, i.e., to the respectively used remote telecommunication system 11 of the remote conversation partner R, e.g., a phone or an infotainment system of another vehicle and the like, prior to establishment of a requested phone call informing the remote conversation partner R about the presence of detected additional listeners L. In that vein, the driver D, the remote conversation partner R, and the additional listeners L are protected from unpleasant conversations and/or unintentional spreading of business and/or confidential information.

The occupant detection system 1 may be provided for this particular purpose or may already be integrated in the vehicle 100 for other applications. The occupant detection system 1 may include amongst others one or several cameras 3 (e.g. an interior camera), one or several microphones 4 (e.g. an interior directional microphone), near field radar 5, seat occupation sensors 6 (e.g., seat detection mats), seatbelt sensors and the like. In the case of commercial driving services (cabs, ride pooling and the like), passenger booking information may be available that could also be used for this purpose.

As soon as the telecommunication system 2 receives a call request for a phone call between the vehicle occupant D and the remote conversation partner R, a system control 12 (e.g., a software application running on a processor of the telecommunication system 2) may first read out the information provided by the occupant detection system 1 before the call is actually put through.

For example, when the driver D initiates an outgoing call to the remote conversation partner R, the system 10 checks first for potential additional listeners L. However, the remote conversation partner's phone (or similar device) may ring normally. If no additional listeners L are found inside the vehicle 100, the connection is then established as soon as the remote conversation partner R answers the incoming call from the driver D.

If additional listeners L are present however, the system control 12 first sends out a notification 9 to the remote telecommunication system 11 of the remote conversation partner R prior to establishment of the requested phone call informing the remote conversation partner R about the presence of additional listeners L. For example, the mobile phone of the remote conversation partner R may play an audio file informing him or her about the fact that the driver D is trying to call him or her while additional listeners L are present in the background. To give another example, the mobile phone may ring as usual while at the same time display a message and/or a graphical indication that additional listeners are to be expected during the phone call. The remote conversation partner R may then decide whether to take the call or not. In any case however, the remote conversation partner R can take care straightaway from the start of the phone call not to compromise the driver D by making potentially problematic statements in front of the additional listeners L.

Alternatively, the remote conversation partner R may try to call the driver D. The telecommunication system 2 of the vehicle 100 may then not immediately establish an audio and/or video connection to the driver D (e.g., to the driver's D mobile phone) and may not even notify the driver D at first about the call. First, the system control 12 may check for additional listeners L if the telecommunication system 2 receives such a call from the remote conversation partner R and may then inform the remote conversation partner R about the outcome. Only if the remote conversation partner R then agrees to continue with the call, the driver D may be rung and the connection subsequently established. The remote conversation partner R may provide his or her consent simply by staying on the line. A connection may, for example, be established a predefined time period after sending of the notification 9. Alternatively, the remote conversation partner R may be required to actively confirm the intention to continue with the call.

In order to avoid potential General Data Protection Regulation (GDPR) conflicts, the present system 10 may provide an additional deactivation functionality in order to give a user the means to switch off the system manually at any time. However, in addition, the present system 10 also provides automatic deactivation functionalities, as described below.

The telecommunication system 2 is further configured to access a contact blacklist listing contacts for which the notification 9 is suppressed by the telecommunication system 2 irrespective of any detected additional listeners L when the respective contact serves as the remote conversation partner R. Through this personal blacklist, the driver D can suppress sending of the notification 9 specifically for particular contacts, i.e., specific remote conversation partners R. Hence, in this case the system 10 is disabled only for the contacts on the blacklist. These persons will then not be informed about the current vehicle occupancy status.

By further creating exceptions, sending of the notification 9 can also be suppressed by the system 10 if specific persons are present as additional listeners L inside the vehicle 100. More generally, an occupant status may be allocated to each detected additional listener L, the occupant status defining privacy settings for the respective additional listener L. The telecommunication system 2 may then be configured to send the notification 9 to the remote conversation partner R depending on the allocated occupant statuses of the detected additional listeners L. For example, the telecommunication system 2 may be configured to suppress the notification 9 when the occupant statuses define a privacy exception for at least one of the detected additional listeners L.

To implement the above feature, the occupant detection system 1 may be configured to allocate the occupants statuses by identifying the respective additional listeners L inside the vehicle 100. For example, a personal electronic device 7 may be connected to a wireless network 8 within the vehicle 100 and may thus be identified and tracked in order to identify the corresponding passenger. Moreover, various other techniques may be employed including but not limited to facial recognition (using a camera 3), voice recognition (using a microphone 4), analyzing boarding patterns (e.g., step sequences monitored by a camera 3), verifying passenger booking information and/or evaluating an occupation history of the vehicle 100, which may include any relevant information about passengers who have used the vehicle 100 in the past (including pick-up and drop-off locations/times and the like).

If an occupant is detected for the first time, the system 10 may initiate an exception creation process, where the driver D is asked, e.g., via a display, if a new exception is to be set for the occupant. The display may be arranged such that it is not visible for the other occupant(s), e.g., HUD and/or instrument cluster. These exceptions (as well as the blacklist mentioned above) may then be stored by the system control 12 in a respective database. Specific exception rules may then be loaded as soon as an occupant is identified, and the system may check if the remote conversation partner R is on the blacklist or not.

The corresponding method M shown in FIG. 3 may thus include under M1 detecting with the occupant detection system 1 additional listeners L inside the vehicle 100. The method M may further include under M2 allocating an occupant status to each detected additional listener L by the occupant detection system. The method M may further include under M3 receiving a call request with the telecommunication system 2 in the vehicle 100 for a phone call between the vehicle occupant D and the remote conversation partner R. The method M may then include under M4 sending a notification to the remote conversation partner R with the telecommunication system 2 prior to establishment of the requested phone call informing the remote conversation partner R about the presence of detected additional listeners.

In the foregoing detailed description, various features are grouped together in one or more examples with the purpose of streamlining the present disclosure. It is to be understood that the above description is intended to be illustrative, and not restrictive. It is intended to cover all alternatives, modifications and equivalents of the different features and embodiments of the present disclosure. Many other examples should be apparent to one having ordinary skill in the art upon reviewing the above specification. The embodiments were chosen and described in order to explain the principles of the present disclosure and its practical applications, to thereby enable others having ordinary skill in the art to utilize the present disclosure and various embodiments with various modifications as are suited to the particular use contemplated.

REFERENCE LIST

1 occupant detection system
2 telecommunication system
3 camera
4 microphone
5 near field radar
6 seat occupation sensor
7 personal electronic device
8 wireless network
9 notification
10 system for providing privacy protection
11 remote telecommunication system
12 system control
13 seat
100 motor vehicle
D vehicle occupant
L additional listener
R remote conversation partner
M method
M1-M4 method steps

What is claimed is:

1. A method for providing privacy protection in preparation for a phone call between a vehicle occupant of a vehicle and a remote conversation partner, the method comprising:
   detecting, by an occupant detection system of the vehicle, additional listeners inside the vehicle;
   receiving a call request with a telecommunication system in the vehicle for the phone call between the vehicle occupant and the remote conversation partner, the phone call being an outgoing call or an incoming call;
   sending a notification to the remote conversation partner with the telecommunication system prior to establishment of the phone call informing the remote conversation partner about the presence of detected additional listeners; and
   allocating an occupant status to each detected additional listener of the detected additional listeners by the occupant detection system, the occupant status defining privacy settings for respective detected additional listeners,
   wherein the notification is sent to the remote conversation partner depending on the allocated occupant statuses of the detected additional listeners.

2. The method according to claim 1, wherein the occupant detection system detects the additional listeners by using at least one of a camera, a microphone, a near field radar, a seat occupation sensor, a seat-belt sensor or passenger booking information.

3. The method according to claim 1, wherein the telecommunication system accesses a contact blacklist listing contacts for which the notification is suppressed by the telecommunication system irrespective of any detected additional listeners when a respective contact serves as the remote conversation partner.

4. The method according to claim 1, wherein the notification is suppressed by the telecommunication system when the occupant statuses define a privacy exception for at least one of the detected additional listeners.

5. The method according to claim 1, wherein the occupant detection system allocates the occupant statuses by identifying the respective detected additional listeners by at least one of identifying a personal electronic device within the vehicle, employing facial recognition, employing voice recognition, analyzing boarding patterns, verifying passenger booking information or evaluating an occupation history of the vehicle.

6. A system for providing privacy protection in preparation for a phone call between a vehicle occupant of a vehicle and a remote conversation partner, the system comprising:
   an occupant detection system configured to detect additional listeners inside the vehicle; and
   a telecommunication system configured to receive a call request for the phone call between the vehicle occupant and the remote conversation partner, the phone call being an outgoing call or an incoming call,
   wherein the telecommunication system is configured to send a notification to the remote conversation partner prior to establishment of the phone call informing the remote conversation partner about the presence of detected additional listeners,
   wherein the occupant detection system is configured to allocate an occupant status to each detected additional listener of the detected additional listeners, the occupant status defining privacy settings for respective detected additional listeners, and
   wherein the telecommunication system is configured to send the notification to the remote conversation partner depending on the allocated occupant statuses of the detected additional listeners.

7. The system according to claim 6, wherein the occupant detection system is configured to detect the additional listeners by using at least one of a camera, a microphone, a near field radar, a seat occupation sensor, a seat-belt sensor or passenger booking information.

8. The system according to claim 6, wherein the telecommunication system is configured to access a contact blacklist listing contacts for which the notification is suppressed by the telecommunication system irrespective of any detected additional listeners when a respective contact serves as the remote conversation partner.

9. The system according to claim 6, wherein the telecommunication system is configured to suppress the notification when the occupant statuses define a privacy exception for at least one of the detected additional listeners.

10. The system according to claim 6, wherein the occupant detection system is configured to allocate the occupant statuses by identifying the respective detected additional listeners by at least one of identifying a personal electronic device within the vehicle, employing facial recognition, employing voice recognition, analyzing boarding patterns, verifying passenger booking information or evaluating an occupation history of the vehicle.

11. A motor vehicle comprising the system of claim 6.

* * * * *